United States Patent [19]

Byrne

[11] Patent Number: 4,557,296

[45] Date of Patent: Dec. 10, 1985

[54] METER TUBE INSERT AND ADAPTER RING

[76] Inventor: Thomas E. Byrne, P.O. Box 80123, Midland, Tex. 79709

[21] Appl. No.: 611,831

[22] Filed: May 18, 1984

[51] Int. Cl.[4] .......................... F16L 55/10; F15D 1/02
[52] U.S. Cl. ..................................... 138/44; 73/861.61
[58] Field of Search ................. 138/40, 44; 73/861.61; 29/445

[56] References Cited

U.S. PATENT DOCUMENTS

| | | |
|---|---|---|
| 333,789 | 1/1886 | Spear . |
| 1,145,222 | 7/1915 | Wilkinson . |
| 1,145,234 | 7/1915 | Dodge . |
| 1,206,185 | 11/1916 | Weymouth . |
| 1,208,532 | 12/1916 | Fawcus . |
| 1,248,057 | 11/1917 | Bailey . |
| 1,266,428 | 5/1918 | Dodge . |
| 1,273,597 | 7/1918 | Fisher . |
| 1,298,471 | 3/1919 | Dodge . |
| 1,298,532 | 3/1919 | Mapelsden . |
| 1,559,156 | 10/1925 | Bullock . |
| 1,575,259 | 3/1926 | Fisher . |
| 1,631,264 | 6/1927 | Haldeman . |
| 1,654,559 | 1/1928 | Spitzglass . |
| 1,698,314 | 1/1929 | Mapelsden . |
| 1,731,404 | 10/1929 | Wetherill . |
| 1,850,030 | 3/1932 | Pardoe . |
| 1,904,333 | 4/1933 | Smith, Jr. . |
| 1,980,672 | 11/1934 | Engel . |
| 2,062,584 | 12/1936 | Langdon . |
| 2,252,337 | 8/1941 | Worthen . |
| 2,407,951 | 9/1946 | Daniel . |
| 2,703,013 | 3/1955 | Wildhack . |
| 2,804,928 | 9/1957 | Farrar ................................ 138/44 X |
| 2,942,465 | 6/1960 | Carbone . |
| 3,037,384 | 6/1962 | Good . |
| 3,126,917 | 3/1964 | Hodgeman et al. ................... 138/44 |
| 3,517,700 | 6/1970 | Williams et al. ...................... 138/44 |
| 3,686,946 | 8/1972 | Halmi . |
| 3,733,902 | 5/1973 | Halmi . |
| 3,889,537 | 6/1975 | Khuzaie . |
| 4,249,164 | 2/1981 | Tivy . |
| 4,290,315 | 9/1981 | Gronberg . |
| 4,372,171 | 2/1983 | Brandt, Jr. . |
| 4,393,722 | 7/1983 | Scott . |
| 4,422,339 | 12/1983 | Gall et al. ........................ 138/44 X |
| 4,478,251 | 10/1984 | Sanchez et al. ....................... 138/44 |

Primary Examiner—James E. Bryant, III
Attorney, Agent, or Firm—Marcus L. Bates

[57] ABSTRACT

A meter run has a meter tube fitting of a configuration which includes an annular cavity. The cavity has confronting faces spaced from one another. An orifice plate holder is received in axially aligned relationship therebetween so that flow must occur through the central orifice formed in the orifice plate. A meter tube insert is positioned within the meter tube fitting and includes reduced diameter confronting annular flanges having faces spaced from one another substantially the same amount as the spacing of the confronting faces of the cavity. An adaptor assembly includes an outer annular gasket, an annular main support body, an inner annular gasket, and an orifice plate. The orifice plate is mounted within the inner annular gasket, the inner annular gasket is mounted within a passageway formed through the main support body, and the main support body is sealingly mounted within the outer annular gasket. The outer and inner gaskets, respectively, concurrently sealingly engage the confronting faces of the fixture and the insert, respectively.

15 Claims, 6 Drawing Figures

U.S. Patent  Dec. 10, 1985  Sheet 1 of 2  4,557,296
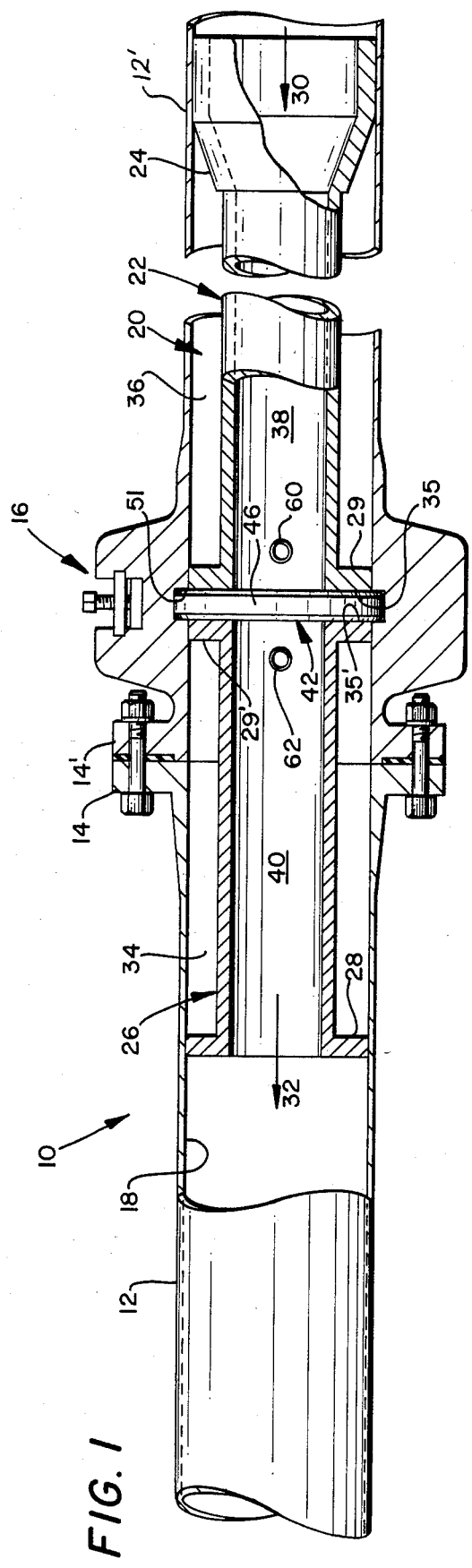
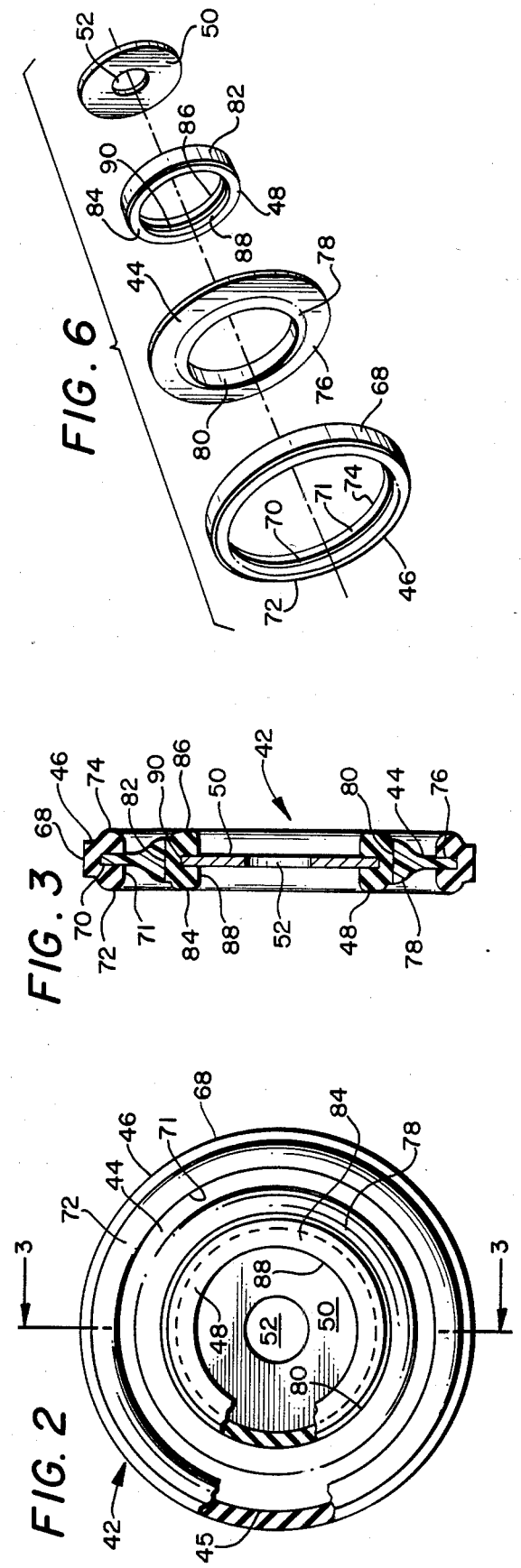

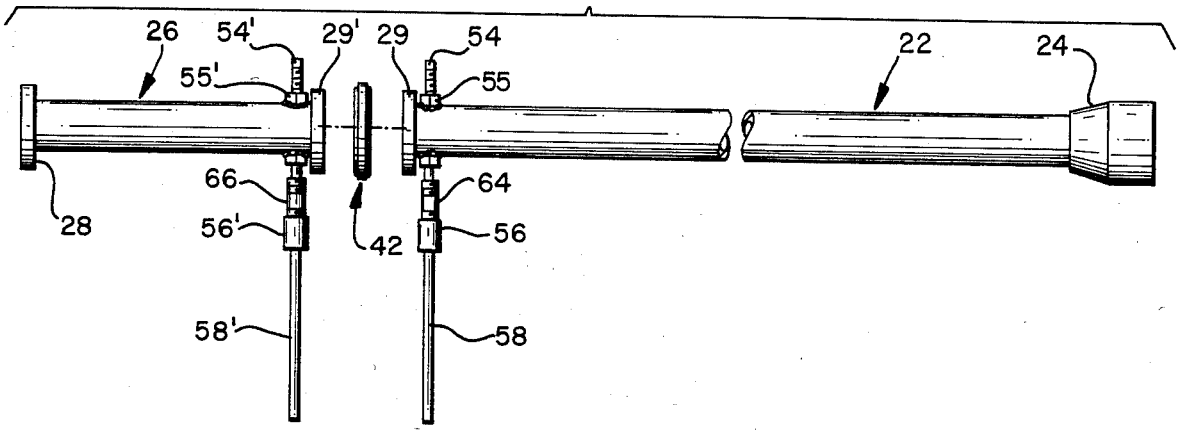
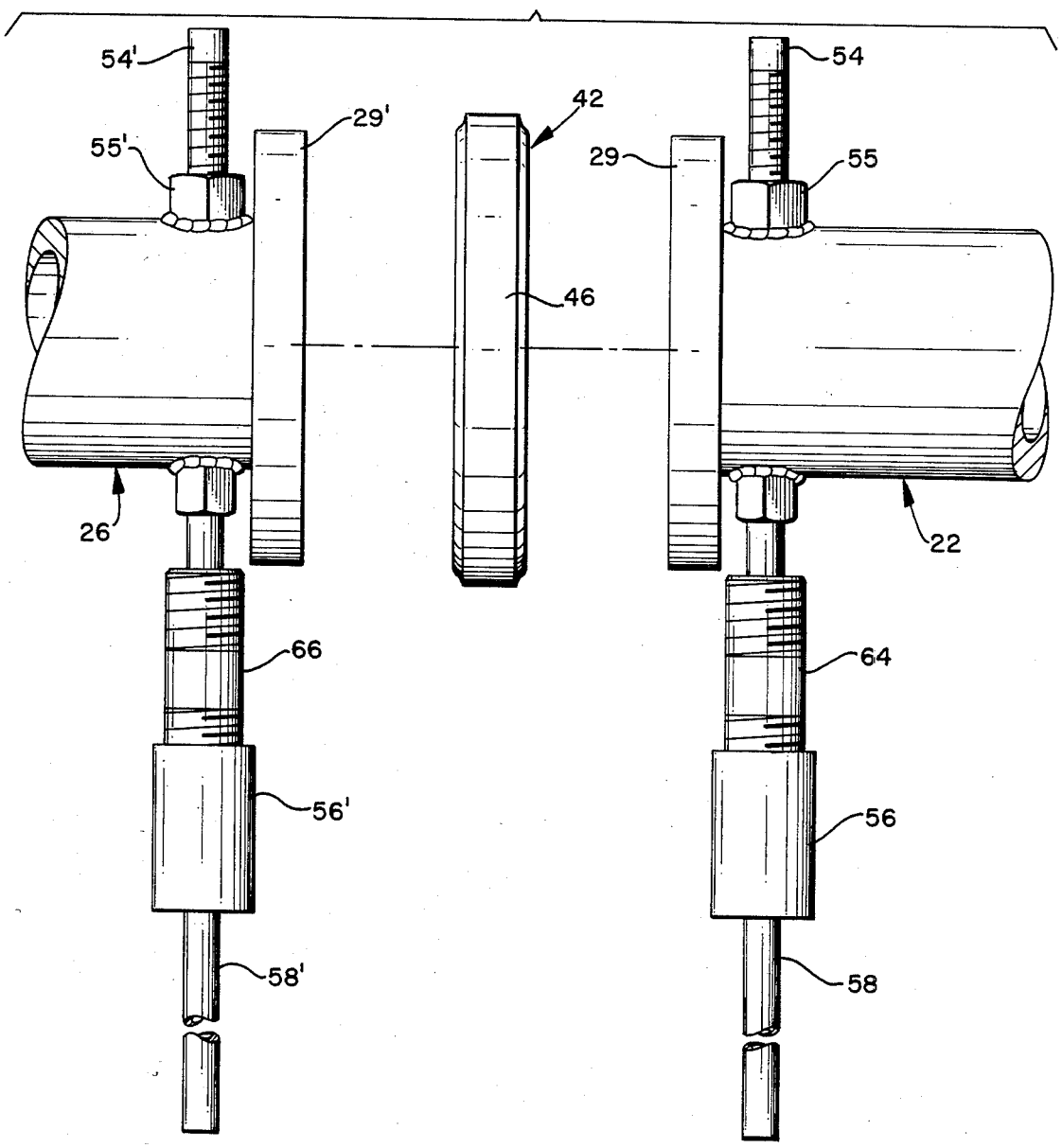

METER TUBE INSERT AND ADAPTER RING

BACKGROUND OF THE INVENTION

There are numerous prior art meter runs having orifice plates mounted therein which are used for measuring the flow of gases and liquids. For example, out in the oil patch, when a new production field is first opened, the meter runs are of very large diameter, as for example 12 inches i.d., that employ a large orifice plate having a large bore formed therein, for example a 4 inch diameter bore, which provides an acceptable beta ratio. As the years go by and the production diminishes, the large flow lines are no longer needed. However, since the large flow lines are already installed, it is uneconomical to substitute a small flow line therefor. Furthermore, it is always possible that additional lateral lines will someday be incorporated into and augment the original flow line, so it is often advantageous to leave the large line installed.

However, the large 12 inch meter run presents a flow measuring problem because the orifice plate associated therewith must be provided with a progressively smaller orifice, or flow passageway, as the flow through the meter run diminishes over the years. The ratio of the orifice located along the central axis of the orifice plate to the diameter of the meter run is called the beta ratio. The beta ratio must be within a predetermined limit in order for reliable measurement of the fluid flowing therethrough to be achieved.

It is quite expensive to replace a 12 inch meter run with a 4 inch meter run, for example. Instead, those skilled in the art have discovered that a large existing meter run can be effectively reduced to any predetermined smaller size by incorporating a meter tube insert therewithin. The meter tube insert is usually telescopingly positioned within the old meter run, and when the reduced diameter orifice plate is incorporated therewith, the beta ratio is brought into a more satisfactory range of values.

It is known to install a reduced diameter tube within an existing flow line, as evidenced by the following U.S. patents: Dodge No. 1,266,428; Mapelsden No. 1,698,314; and Carbone No. 2,942,465. However, none of these patents disclose a meter tube insert which is installed within an existing meter run in order to achieve a more favorable beta ratio.

There are available various different meter tube fittings for holding an orifice plate within a meter run, as evidenced by the U.S. patents to Haldeman No. 1,631,264; Fisher No. 1,575,259; Engel No. 1,980,672; Daniel No. 2,407,951; Smith No. 1,904,333; and Worthen No. 2,252,337. Some of these devices employ simple confronting type flanges, while others are more complex for enabling the orifice plate to more easily be assembled in sealed relationship between the confronting faces of the fitting cavity. Some of the above recited patents teach that the orifice plate can be held within some sort of fixture. Gall, et al U.S. Pat. No. 4,442,339; Scott U.S. Pat. No. 4,393,722; and Wetherill U.S. Pat. No. 1,731,404 also teach that an orifice plate can be mounted within a fixture to thereby simplify the task of changing or inspecting the orifice plate.

Furthermore, Applicant has reason to believe that public disclosure has been made of a meter tube insert of a type wherein a commercially available meter tube fitting of a meter run is sized down to a more suitable diameter in order to improve the beta ratio. However, in this particular prior art combination of a meter tube fitting and insert, difficulty has been experienced in properly installing the orifice plate and later retrieving the orifice plate from the fitting and insert. The present invention disclaims the meter tube fitting and the meter tube insert, and accordingly, the subject of the present invention embraces an adaptor apparatus by which an orifice plate can be concurrently mounted in sealed relationship respective to the confronting faces of both a meter tube fitting and a meter tube insert.

SUMMARY OF THE INVENTION

A meter run for measuring flow of fluid has a commercially available meter tube fitting for receiving the usual orifice plate in mounted relationship therewithin, thereby enabling accurate flow measurements to be achieved under the proper flow conditions. In order to reduce the effective diameter of the meter run, and thereby improve the beta ratio, a meter tube insert is installed which has a reduced diameter upstream and a reduced diameter downstream member. The two members have confronting flange faces, each of which lie in a parallel plane respective to the faces of the cavity found in the meter tube fitting. The cavity normally sealingly engages the annular gasket located in a standard orifice plate.

The present invention provides an adaptor apparatus for sealingly aligning an orifice plate whereby the orifice or central bore of the orifice plate is precisely aligned respective to the longitudinal axial centerline of the meter tube insert, and hence the longitudinal axis of the meter run.

The adaptor apparatus of this invention has an outer annular gasket within which an annular mount member is sealingly received, with the annular mount member having a passageway formed therethrough. The inside circumferentially extending wall surface of the passgeway sealingly receives an inner annular gasket thereagainst. An orifice plate is mounted within the inner annular gasket. The inner annular gasket sealingly engages the parallel, spaced apart faces of the meter tube insert, while the large annular gasket sealingly engages the parallel faces of the cavity of the metering tube fitting. Hence, the small and large annular gaskets are concentrically arranged respective to one another and simultaneously concurrently sealingly engage both the meter tube insert and the meter tube fitting.

The adaptor apparatus of the present invention, in combination with a meter tube insert and meter tube fitting, enables selection of the most optimum beta ratio respective to the flow rate through a relatively large flow line.

Accordingly, a primary object of the present invention is the provision of a means by which the beta ratio of a meter run having an orifice plate associated therewith can be favorably adjusted towards an optimum value.

A further object of the present invention is the provision of a combination of an adaptor apparatus, meter tube insert, and meter tube fitting which enables the beta ratio of a meter run to be improved.

Another object of the invention is the provision of an orifice plate adaptor apparatus for use in conjunction with a meter tube insert and a meter tube fitting, wherein dual concentric gaskets located on the adaptor apparatus concurrently sealingly engage the meter tube insert and the meter tube fitting, while enabling the bore through the orifice plate to be precisely aligned with the longitudinal axis of the meter run.

A still further object of this invention is the provision of an improved meter run having an adaptor device for use in combination with a meter tube insert and a meter tube fitting for precisely aligning an orifice plate of the adaptor device in sealed relationship.

An additional object of this invention is the provision of an adaptor apparatus for use in conjunction with a meter tube insert and meter tube fitting having a main annular support body to which an outer annular gasket and an inner annular gasket are sealingly attached, with an orifice plate being mounted within the inner annular gasket.

These and various other objects and advantages of the invention will become more readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 1 is a longitudinal, cross-sectional view of a meter run having apparatus made in accordance with the present invention associated therewith;

FIG. 2 is an enlarged, front view of part of the apparatus disclosed in FIG. 1, with some parts being broken away therefrom and some of the remaining parts being shown in cross-section;

FIG. 3 is a cross-sectional view taken along line 3—3 of FIG. 2;

FIG. 4 is a disassembled view of part of the apparatus disclosed in FIG. 1;

FIG. 5 is an enlarged, fragmentary, disassembled view of part of the apparatus disclosed in FIGS. 1 and 4; and, FIG. 6 is an exploded view of the apparatus disclosed in FIGS. 2 and 3.

DETAILED DESCRIPTION OF THE PREFERRED EMBODIMENT

In FIG. 1, there is disclosed a meter run 10 for measuring the rate of flow through series connected pipes 12 and 12'. The meter run includes a pair of confronting flanges 14, 14', which enables attachment of a meter tube fitting 16 of ordinary design into the flow line.

The pipe 12, 12' has a relatively large i.d. 18, and the effective diameter of a marginal length thereof has been reduced by incorporation therewithin of a meter tube insert 20. The insert includes an upstream member 22 having a bell reducer 24 formed at the upstream marginal end thereof. The insert further includes the illustrated downstream member 26. Centralizers 28, 29, and 29' are in the form of spaced annular flanges and are sized to maintain the upstream and downstream members 22 and 26 concentrically arranged respective to the longitudinal axis of the pipe 12, 12' and meter tube fitting 16.

The confronting insert flanges 29, 29' are spaced from one another and include parallel faces aligned parallel respective to similar annular faces formed within the fitting. Numeral 30 indicates the direction of flow into the entrance of the modified meter run, while numeral 32 indicates the outlet for flow from the modified meter run.

An annular void or dead space 34 is formed about member 26, while an annular void 36 is formed about member 22. Numerals 38 and 40, respectively, indicate the reduced diameter flow passageways formed upstream and downstream, respectively, of the orifice location.

An adaptor apparatus 42, made in accordance with the present invention, is sealingly captured in a removable manner by the confronting sidewalls presented by the fitting cavity, and the confronting sidewalls presented by the insert flanges. As seen in FIGS. 2, 3, and 6; the adaptor apparatus 42, made in accordance with the present invention, is of annular construction, and includes an outer annular gasket 46, an inner gasket 48, an annular mount member 44, and an orifice plate 50, as will be more fully discussed later on in this disclosure.

The meter tube insert upstream member 22 therefore forms a reduced diameter axial flow passageway 38, while the downstream member 26 forms a reduced diameter axial flow passageway 40, with there being an adaptor apparatus 42, made in accordance with the present invention, suitably mounted in sealed relationship within the meter tube fitting 16 in such a manner that all of the flow at 30 must proceed through the axial bore of the orifice plate and exit at 32, with there being no leakage of the metered fluid around the orifice plate.

The adaptor apparatus 42 comprises an adaptor ring in the form of an annular mount member 44, an outer gasket 46 having an inner circumferentially extending groove 70 within which the outer marginal circumferentially extending edge 76 portion of the mount member is received. An inner annular gasket 48 has a circumferentially extending groove formed about the inner face thereof for receiving the outer marginal circumferentially extending edge portion of an orifice plate having an orifice or bore 52 formed axially therethrough.

The outer gasket 46 is of conventional design and is received within the annular pocket or cavity 51 of the fitting 16 in the usual manner. The inner annular gasket 48 is also of conventional design and received in sealed relationship between the confronting faces of flanges 29, 29' of the meter tube insert in a novel manner. The orifice plate 50, which can be of conventional design, is received within the inner gasket 48 in the usual manner so far as regards the gasket and orifice plate per se. The mount member 44 has a circumferentially extending relatively thin edge portion 45 which is received within the groove formed within the outer annular gasket in a manner similar to the outer marginal circumferentially extending edge of an orifice plate.

As seen illustrated in FIGS. 4 and 5, together with other figures of the drawings, the meter tube insert includes alignment bolts 54, 54', respectively, threadedly made up with bosses 55, 55', respectively, at a position near the confronting flanges 29, 29'. Couplings 56, 56' and nipples 64, 66 provide a means by which signal conduits 58, 58', respectively, can be connected to the interior 38 and 40, respectively, of the meter tube insert members 22 and 26 at a location indicated by numerals 60 and 62 of FIG. 1, for example.

In operation, assuming that a conventional meter tube fitting 16 is part of the meter run 10, the confronting flanges 14, 14' of fixture 16 are broken to gain access to the interior 18 of the flow system. The old meter run is cleaned up, and the upstream and downstream insert tube members 22 and 26 are telescopingly slid into the illustrated position as seen in FIG. 1. The tap holes are aligned with the locking screw nuts and the tube insert tap hole. Next the signal tubing 58, 58' is placed through the top tap hole, and the insert tap hole coupling 56, 56' is screwed into place. The bottom lock screw is placed through the bottom tap hole of the fitting and screwed into place. Both the upstream and downstream insert members are axially aligned respective to the longitudinal axis of the old meter run.

Parker CPI drill through fittings are placed over the signal tubing 58 and the connector is tightened. Proper tube connections as may be needed are installed to adapt the meter piping or manifold valve.

The adaptor apparatus 42 is next inserted into the cavity 51 formed within the meter tube fitting. The adaptor apparatus must slowly be moved into position to prevent damage to the inner and outer annular gaskets.

The outer annular gasket 46 has opposed sidewalls 72, 74 which sealingly engage the complementary confronting sidewalls of the annular cavity 51 formed within the meter tube fitting 16. The inner annular gasket 48 has a circular outer sidewall 82 which sealingly engages the inner circumferentially extending wall surface 80 of the annular mount member 44. The inner annular gasket includes opposed sidewalls 84, 86 which preferably extend slightly outwardly of the opposed wall surfaces 78 of the enlarged portion of the annular mount member. The opposed sidewalls 84, 86 of the inner annular gasket sealingly engage the confronting faces of spaced insert flanges 29, 29'. Accordingly, outer annular gasket 46 sealingly engages the entire circumferentially extending annular area found on each opposed wall surface of the fitting cavity in the same manner associated with the prior art mounting of an orifice plate and fitting cavity. Hence, broadly the mount member 44 sealingly engages the outer annular gasket 46 and provides a means by which the inner annular gasket 48 is sealed to the mount member 44; and, at the same time, the inner annular gasket provides a seal groove at 70 for receiving the orifice plate 50 in mounted relationship therewithin. The outer wall surfaces 84, 86 of the inner annular gasket sealingly engage the confronting flanges of the meter tube insert. Accordingly, there is no need for a sealed fit between the bell reducer 24 and the interior 18 of the meter run because the adaptor ring of the present invention cooperates with the prior art fitting 16 in a manner whereby flow can only occur from 30, through the bore 52 of the orifice plate 50, through the interior 40 of member 26, and downstream at 32.

The sensing tube connection 60, 62 are brought through the annular voids 36, 34 and through the conventional tapped passageway formed in the meter tube fitting 16. The sealed tubing 58, 58' is flow connected to suitable measuring and recording apparatus so that the pressure differential across the orifice plate can be accurately recorded as may be desired.

In one example of the present invention, a standard meter tube fitting 16 manufactured by Daniel Industries, Inc., of a four inch size was connected to a four inch diameter pipe 12 to form one meter run 10. Member 22 was two inches in diameter having a bell reducer 24 which reduced the size from four inches to two inches. The centralizers or flanges 28, 29, and 29' were of a diameter which enabled the asemblies to be received within the interior 18 of the pipe 12, 12'. The length of member 22 was thirty-six inches while the length of member 26 was eighteen inches. The confronting faces 35, 35' of the spaced flanges 29, 29' were milled smooth so that the inner annular gasket was forced into sealed relationship therebetween as the outer annular gaskets simultaneously sealingly engage the parallel walls forming the cavity 51 of the fitting 16.

The Beta ratio is defined as $\beta = D_2/D_1$ which is the orifice to pipe diameter (page 850, 851 Perry Chemical Engineering Handbook, 2nd Edition 1941, McGraw Hill).

I claim:

1. In a meter run having a meter tube fitting with a meter tube insert included therein by which the orifice to pipe diameter ratio may be improved, wherein said meter tube fitting has confronting annular faces which form a cavity, an said tube inserts has confronting flange faces aligned with the confronting faces of the meter tube fitting, the combination with said meter tube fitting and meter tube insert of an adaptor apparatus;

said adaptor apparatus has an outer annular resilient gasket for sealingly engaging the annular confronting faces of the meter tube fitting; an annular body carried on the interior of the outer gasket, said annular body has an axial passgeway formed therethrough of reduced diameter respective to the inside diameter of the outer annular gasket;

an inner annular gasket of resilient material, said inner annular gasket has an outer seal surface formed thereon which is sealingly received within said axial passageway;

an annular orifice plate, said inner annular gasket has a groove formed about the interior thereof by which the outer circumferentially extending marginal edge of said plate is received therewithin, whereby said outer gasket supports said annular body, said annular body supports said inner gasket, and said inner gasket supports said orifice plate.

2. The combination of claim 1 wherein said outer annular gasket has a groove formed on the interior thereof; said annular body has a relatively thin outer circumferentially extending surface which is sealingly received within said groove formed on the interior of said outer annular gasket; and said annular body has an inner wall surface which forms said axial passageway, means by which said inner wall surface sealingly receives said inner annular gasket therewithin.

3. The combination of claim 1 wherein said annular body has an enlarged annular part which is spaced inwardly from a thin annular outer part, said enlarged annular part has a wall surface for sealingly receiving the outer surface of said inner gasket therein.

4. The combination of claim 3 wherein said orifice plate is a substantially flat round member having an axial bore through which fluid can flow.

5. The combination of claim 1 wherein said annular body has a relatively thin outer circumferential surface for being sealingly received within a circumferentially extending groove formed within said outer annular gasket; means on said annular body forming a sealing surface which also forms said axial passageway within which said inner annular gasket is received therein;

said annular body further includes an enlarged annular wall surface spaced inwardly from a thin outer annular wall surface for sealingly receiving the outer circumferentially extending surface of said inner annular gasket therein.

6. A meter run of the type which includes a meter tube fitting, said meter tube fitting includes a cavity formed by confronting faces formed therein; a meter tube insert apparatus mounted within the meter tube fitting by which the ratio of the diameter of orifice to pipe of the meter run can be improved, the tube insert includes confronting faces formed thereon which are arranged in aligned relationship with respect to the confronting faces of the cavity associated with the meter tube fitting, the combination with said fitting and insert of an adaptor apparatus;

said adaptor apparatus includes means forming an outer annular resilient gasket of a size which sealingly engages the confronting faces of the cavity formed within the fitting; an annular body carried on the interior of the outer annular gasket in sealed relationship therewith, said annular body has an axial passageway formed therethrough of reduced diameter respective to the inside diameter of the outer annular gasket;

an inner annular gasket of resilient material, said inner annular gasket has means forming an outer seal surface thereon which is of a size for being sealingly received within said axial passageway of said annular body;

an annular orifice plate, means forming a groove about the interior of said inner annular gasket by which the outer cicumferentially extending marginal edge of said orifce plate is received in sealed relationship therewithin; whereby, said outer gasket supports said annular body, said annular body supports said inner gasket, and said inner gasket supports said orifice plate so that all of the flow that occurs through the meter run must occur through the annular orifice plate.

7. The combination of claim 6 wherein a groove is formed about the interior of said outer annular gasket; said annular body has a relatively large circumferentially extending inner surface; and, a relatively thin outer circumferentially extending surface for being sealingly received within the groove formed on the interior of said outer annular gasket.

relatively smaller orifice plate to be used therewith and thereby improve the beta ratio of the meter run; wherein said tube insert has confronting faces aligned with the confronting faces which form the usual cavity associated with the meter tube fitting, so that an orifice can be mounted respective to said fitting and tube insert in a manner whereby flow must occur therethrough; the improvement comprising:

an adaptor apparatus for mounting an orifice plate in sealed relationship respective to the tube insert confronting faces and the cavity confronting faces; said adaptor apparatus has an outer annular resilient gasket for sealingly engaging the annular faces of the fitting an annular body, means by which said annular body is carried on the interior of the outer gasket, said annular body has an axial passageway formed therethrough of reduced diameter respective to the inside diameter of the outer gasket;

an inner annular gasket of resilient material, said inner annular gasket has means forming an outer seal surface thereon by which said inner annular gasket is sealingly received within said axial passageway;

an annular orifice plate, said inner annular gasket has a groove formed about the interior thereof by which the outer circumferentially extending marginal edge of said plate is received therewithin, whereby said outer gasket supports said annular body, said annular body supports said inner gasket, and said inner gasket supports said orifice plate.

12. The improvement of claim 11 wherein said outer annular gasket has a groove formed on the interior thereof, said annular body has a relatively thin outer circumferentially extending surface for being sealingly received with the groove formed on the interior of said outer annular gasket; and a relatively large inner circumferentially extending surface which sealingly receives said inner annular gasket.

UNITED STATES PATENT AND TRADEMARK OFFICE
CERTIFICATE OF CORRECTION

PATENT NO. : 4,557,296
DATED : DECEMBER 10, 1985
INVENTOR(S) : THOMAS E. BYRNE

It is certified that error appears in the above-identified patent and that said Letters Patent is hereby corrected as shown below:

Column 2, line 26, substitute --on-- for "in" after "located";
        Line 44, substitute --meter-- for "metering".

Column 4, line 14, insert --annular-- after "inner".

Column 6, line 13, substitute --and-- for "an"; and substitute --insert-- for "inserts".

Column 8, line 14, insert --;-- after "fitting" and before "an".

Signed and Sealed this

Twenty-fifth Day of March 1986

[SEAL]

Attest:

DONALD J. QUIGG

Attesting Officer

Commissioner of Patents and Trademarks